United States Patent [19]

Amalfitano et al.

[11] Patent Number: 5,303,166

[45] Date of Patent: Apr. 12, 1994

[54] METHOD AND SYSTEM FOR AUTOMATED NETWORK BENCHMARK PERFORMANCE ANALYSIS

[75] Inventors: Eugenie A. Amalfitano, Delray Beach; Gregory J. McKnight, Lake Worth, both of Fla.

[73] Assignee: International Business Machines Corporation, Armonk, N.Y.

[21] Appl. No.: 868,744

[22] Filed: Apr. 14, 1992

[51] Int. Cl.⁵ .............................................. G06F 11/34
[52] U.S. Cl. ....................... 364/551.01; 364/DIG. 1; 364/264.3; 364/264.4; 364/264.5; 371/19; 395/200; 395/500
[58] Field of Search ............ 364/551.01, 200 MS File, 364/578, DIG. 1, 264.3, 264.4, 264.5; 371/16.5, 19; 395/500, 550, 200

[56] References Cited

U.S. PATENT DOCUMENTS

| | | | |
|---|---|---|---|
| 4,802,164 | 1/1989 | Fukuoka et al. | 371/16.1 |
| 5,008,058 | 2/1992 | Salsburg | 364/500 |
| 5,045,994 | 9/1991 | Belfer et al. | 364/DIG. 1 |
| 5,086,386 | 2/1992 | Islam | 395/600 |
| 5,157,779 | 10/1992 | Washburn et al. | 395/575 |
| 5,161,116 | 11/1992 | Schneider et al. | 395/500 |
| 5,245,638 | 9/1993 | Gustafson | 364/550 |

Primary Examiner—Jack B. Harvey
Assistant Examiner—Jae H. Choi
Attorney, Agent, or Firm—Andrew J. Dillon

[57] ABSTRACT

A method and system for automated network benchmark performance analysis which providing a highly realistic benchmark test representative of actual operation of specific software applications, without requiring installation and/or operation of the software applications during testing. Selected software applications generally utilized within a specific network are identified and representative transactions within those applications are executed while tracing the operation of the software application to identify and record input/output operations which occur during those transactions. The recorded list of input/output operations is then utilized to create a benchmark script for utilization in testing which has a high degree of verisimilitude when compared with actual software application operations. Benchmark testing is then performed utilizing the scripted input/output operations and highly accurate performance parameters such as throughput, transactions per second and absolute minimum, maximum and average response times may be determined. Additionally, performance parameter statistics for performance of a selected sequence of input/output operations characteristic of representative transactions may be determined and utilized as a more accurate benchmark for performance than individual response times.

18 Claims, 4 Drawing Sheets

```
Log File: CF.LOG
VERBOSE log option selected, detail records will be printed . . . . . . . . . . . . . . . . . . . . . . . . . . .
      Benchmark Interpreter Program:        version 0.331
Operating system: DOS 1.30
Timer overhead:    7.7105 microseconds
Log buffer size:  64 KB
Log entry size:   198 bytes                            } 130
Entries in log buffer: 330
Run date:      Thu Apr 09, 1992
Run start time: 16:39:56

3 Files defined for this script.

REF NUM    PATHNAME
   1       \CF\F64K\DF0001.000
   2       \CF\F1K\DF0002.000        } 132
   3       \CF\F2K\DF0003.000

Script CF.CLA beginning, iteration count: 1
```

---

```
Procedure: @PROCESS repeated:    1 times

Based on measurement of total elapsed time (including processing):
Procedures per second (total elapsed time):       0.139
Minimum elapsed time for 1 procedure          7190.405 msecs elapsed  } 134
Maximum elapsed time for 1 procedure          7190.405 msecs elapsed
Initialization time for procedure                3.422 msecs
Total elapsed time for procedures             7193.827 msecs elapsed
Average procedure elapsed time                7193.827 msecs
```

|  | TOTAL TIME | TOTAL TIME | THRUPUT |
|---|---|---|---|
| Operation /136 | /138 I/O Time | /140 I/O Time | /142 |
| SR | 0.940 | 469.901 | 532.027 KB/sec |
| SR | 0.714 | 357.076 | 350.065 KB/sec |
| SR | 0.937 | 468.264 | 533.887 KB/sec |
| RR | 1.622 | 810.916 | 77.073 KB/sec |
| RR | 1.613 | 806.567 | 154.978 KB/sec |
| RR | 1.829 | 914.471 | 273.382 KB/sec |
| RR | 1.588 | 794.080 | 78.707 KB/sec |
| RR | 1.617 | 808.571 | 154.594 KB/sec |
| LOCK | 1.024 | 1.024 |  |
| UNLOCK | 0.989 | 0.989 |  |
| SKR | 1.182 | 1.182 | 0.826 KB/sec |
| SKW | 1.188 | 1.188 | 0.822 KB/sec |
| SYSTEM | 627.085 | 627.085 |  |
| ** PROCESS | 7.581 | 758.103 |  |
| TOTAL msecs | 642.329 | 6061.314 |  |

** Indicates emulated PROCESS or DELAY time not included in TOTAL

*Fig. 6*

METHOD AND SYSTEM FOR AUTOMATED NETWORK BENCHMARK PERFORMANCE ANALYSIS

BACKGROUND OF THE INVENTION

1. Technical Field:

The present invention relates in general to performance measurement within a data processing system, and in particular to performance measurement methods and systems for analyzing input/output efficiency in a multiterminal network. Still more particularly, the present invention relates to methods and systems for measurement of input/output efficiency in a multiterminal network utilizing a benchmark test which emulates the input/output characteristics of selected software applications without requiring actual installation of those applications.

2. Description of the Related Art:

Performance monitoring systems within computer hardware or software systems are well known in the prior art. These known performance monitoring systems may comprise hardware devices interposed between multiple devices and a host system, such as the workstation controllers disclosed in U.S. Pat. No. 4,905,171. These workstation controllers monitor and collect data during operation which may be utilized to determine processor performance and communications line performance for each workstation controller. Thereafter, this data is periodically sent to a database maintained by the host and utilized to calculate processor utilization and communications line utilization. In this manner, workloads within the system may be maintained at a desired level of evenness for enhanced system efficiency.

Software monitoring systems are also well known in the prior art. Such systems often utilize so-called "hooks" or uniquely identifiable software elements which are inserted into selected locations in a software application. During execution of the software application each time a hook is encountered performance data is recorded which identifies a selected software component and which may then be utilized to analyze the performance of the software application. Such systems work well in selected applications; however, the processor overhead required to process each hook often artifically degrades the performance of the application under examination.

The interralation between multiple terminals in a network, such as a large number of personal computers coupled to a server device in a Local Area Network (LAN), presents special problems in performance monitoring systems. The ability of a server device to provide service to multiple terminals, personal computers or the like is an important consideration in configuring a network and system architects often seek message systems for analyzing the input/output efficiency of server devices in order to determine the optimum server device for a selected network configuration.

The analysis of server device performance is generally accomplished in the prior art by the execution of a so-called "benchmark test" which is a representative set of programs and data designed to evalurate the performance of computer hardware and software in a given configuration. For example, both the PC Magazine and PC Week trade publications publish a LAN Benchmark Test which may be utilized to evaluate file server performance by executing an arbitrary set of input/output patterns and functions in a manner which is arbitrary or thought to be representative of actual input/output operations. Peter Norton Computing, Inc. of Santa Monica, Calif. also markets a Network Performance Test which operates in a similar manner. While these systems offer some insight into the operation of file servers within a network, the arbitrary nature of the input/output patterns and functions utilized may lead to an inaccurate appraisal of a file server's capabilities.

In an effort to overcome the artificiality of benchmark tests such as those described above, alternate benchmark testing systems have been proposed which operate as a shell encompassing an actual software application. In such systems, the underlying software application is executed and monitored during operation. While these systems represent an increase in the reality aspect of a benchmark analysis they are cumbersome to operate and require the use of an actual software application, with the concomitant concerns involved in licensing, installation and execution.

It should therefore be apparent that a need exists for a method and system for performing a benchmark performance analysis in a data processing network which accurately emulates the input/output characteristics of one or more specific software applications without requiring actual installation and execution of those applications.

SUMMARY OF THE INVENTION

It is therefore one object of the present invention to provide an improved performance measurement system for use with a data processing system.

It is another object of the present invention to provide an improved performance measurement method and system for analyzing input/output efficiency in a multiterminal network.

It is yet another object of the present invention to provide an improved method and system for measurement of input/output efficiency in a multiterminal network utilzing a benchmark test which emulates input/output characteristics of selected software applications without requiring actual installation of those applications.

The foregoing objects are achieved as is now described. The method and system of the present invention may be utilized for automated network benchmark performance analysis while providing a highly realistic benchmark test representative of actual operation of specific software applications, without requiring installation and/or operation of the software applications during testing. Selected software applications generally utilized within a specific network are identified and representative transactions within those applications are executed while tracing the operation of the software application to identify and record input/output operations which occur during those transactions. The recorded list of input/output operations is then utilized to create a benchmark script for utilization in testing which has a high degree of verisimilitude when compared with actual software application operations. Benchmark testing is then performed utilizing the scripted input/output operations and highly accurate performance parameters such as throughput, transactions per second and absolute minimum, maximum and average response times may be determined. Additionally, performance parameter statistics for performance of a selected sequence of input/output operations characteristic of representative transactions may be determined and utilized as a more accurate benchmark for performance than individual response times.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 is an example of a performance analysis report which may be generated utilizing the method and system of the present invention.

DETAILED DESCRIPTION OF PREFERRED EMBODIMENT

Figure 1:
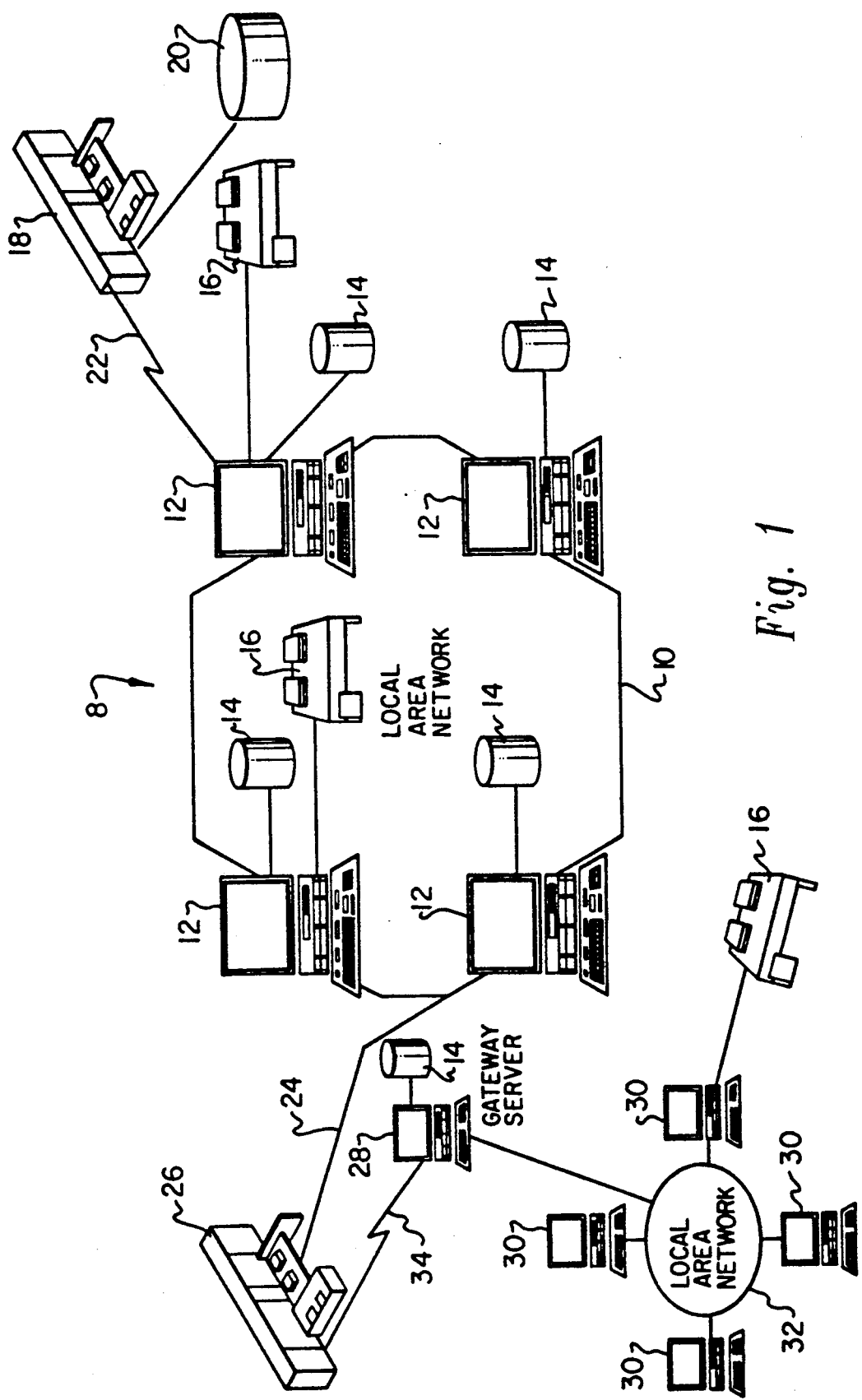
FIG. 1 illustrates a pictorial representative of a data processing network which may be tested utilizing the method and system of the present invention.

With reference now to the figures and in particular with reference to FIG. 1, there is depicted a pictorial representation of a data processing network 8 which may be utilized to implement the method and system of the present invention. As may be seen, data processing network 8 may include a plurality of networks, such as Local Area Networks (LAN) 10 and 32, each of which preferably includes a plurality of individual terminals 12 and 32, respectively. Of course, those skilled in the art will appreciate that terminals 12 and 32 may be implemented utilizing a plurality of personal computers or a plurality of Intelligent Work Station (IWS) coupled to a host processor.

As is common in such data processing networks, each individual terminal/computer may be coupled to a storage device 14 and/or a printer/output device 16. One such storage device 14 may be utilized to store data which is later utilized to generate performance analysis reports which may be created in accordance with the method and system of the present invention, in a manner which will be explained in greater detail herein.

Still referring to FIG. 1, it may be seen that data processing network 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10 and may be coupled via communications controller 26 and communications link 34 to gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data objects, database or documents may be stored within storage device 20 and controlled by mainframe computer 18, as resource manager or library server for the data objects and documents thus stored. The input/output efficiency of any such server device within data processing network 8 will therefore have a major effect on the overall efficiency of the network. Thus, it should be apparent to those skilled in the art that a method and system for performing a benchmark performance analysis within data processing network 8 will be desirable in selecting a server device which is most efficient for the applications generally utilized within data processing network 8.

Figure 2:
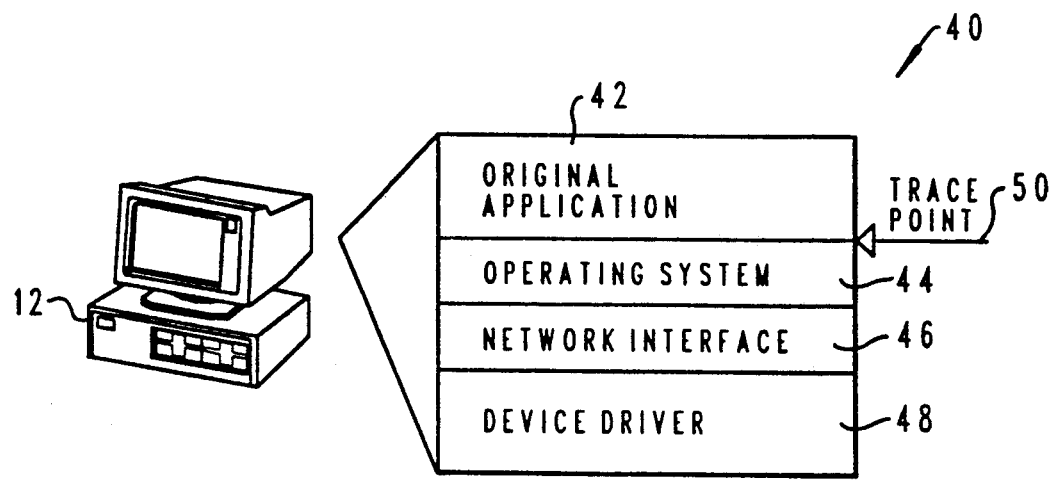
FIG. 2 is a graphic representation of a terminal and software systems executing an application which may be utilized to create a benchmark script for utilization with the method and system of the present invention.

Referring now to FIG. 2, there is depicted a graphic representation of a terminal 12 and a software system 40 which may be utilized to create a benchmark script for utilization with the method and system of the present invention. As described above, terminal 12 may be implemented utilizing a so-called "personal" computer, such as the International Business Machines Corporation PS/2 personal computer, or an Intelligent Work Station (IWS). Software systems 40 preferably include an original application 42 which is an application selected for general utilization within data processing network 8. Operating system 44, network interface 46 and a device driver 48 are also depicted within software system 40 and these systems are interrelated in a manner well known to those skilled in the art. A trace point 50 is graphically depicted which represents the utilization of a trace tool to capture performance-critical operations as such operations occur between application 42 and operating system 44, and record an indication of those operations in a log. Those skilled in the art will appreciate that in the evaluation of file servers within data processing network 8 input/output operations are of special interest for performance analysis.

Trace point 50 is preferably implemented utilizing any suitable trace tool and may be implemented in computers operating in a DOS or other compatible operating system environment utilizing any trace reporting system which can be programmed to capture selected interrupt calls. For example, DOS interrupt calls requesting operating system services are, in the depicted embodiment of the present invention, each identified and recorded in order to provide a representative sample of typical input/output operations which occur during a representative transaction within application 42.

Figure 3:
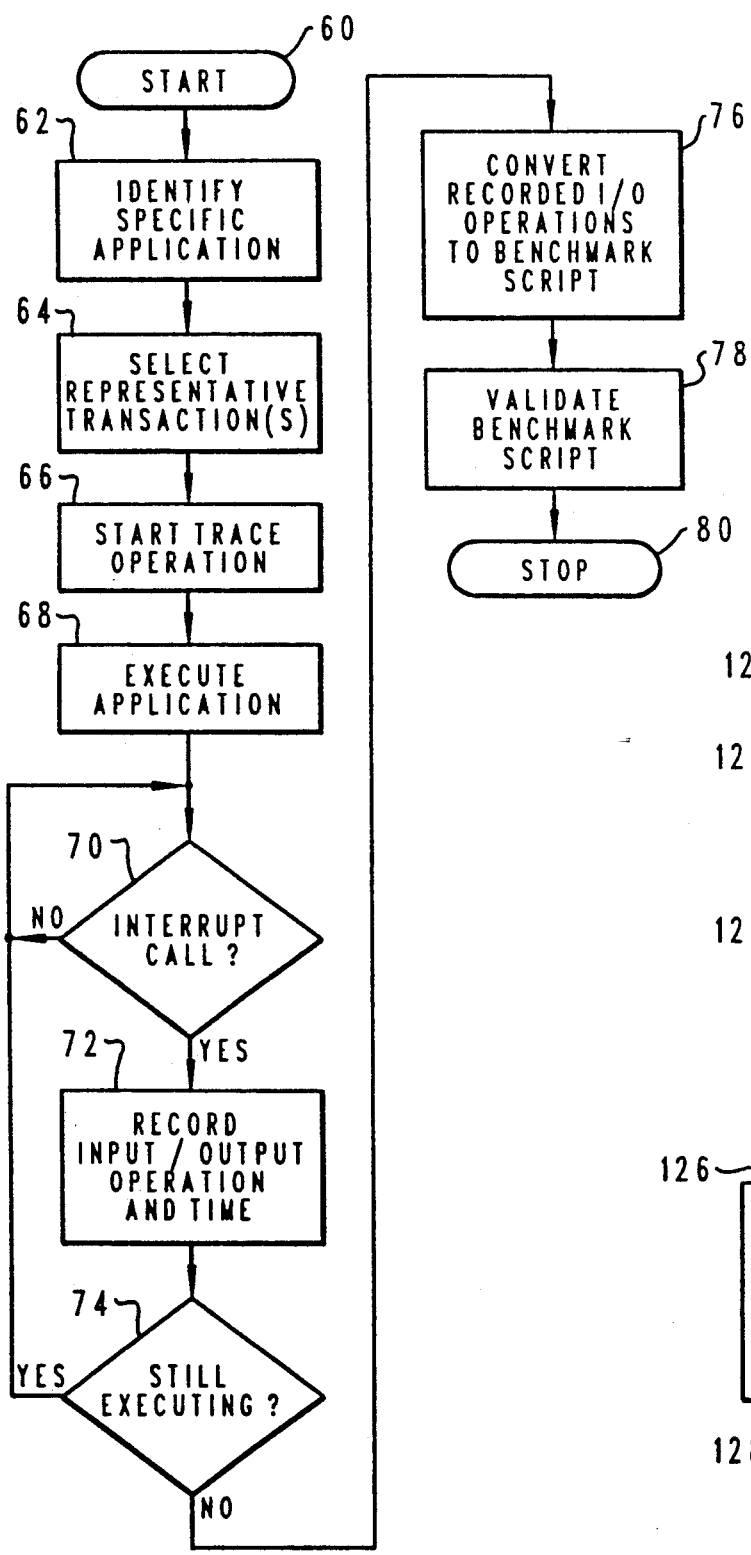
FIG. 3 is a high level logic flowchart illustrating the creation of a benchmark script in accordance with the method and system of the present invention.

With reference now to FIG. 3, there is depicted a high level logic flowchart which illustrates the creation of a benchmark script in accordance with the method and system of the present invention. As illustrated, the process begins at block 60 and thereafter passes to block 62 which depicts the identification of a specific application 42 (see FIG. 2). In accordance with a preferred embodiment of the present invention applications are chosen which are generally utilized within data processing network 8 (see FIG. 1) in order to provide a benchmark performance analysis which has a high degree of verisimilitude. Next, the process passes to block 64 which illustrates the selection of representative transactions within the chosen software application. Those skilled in the art will appreciate that this selection may be accomplished automatically or may be accomplished, in an alternate embodiment of the present invention, by prompting a user to select particular transactions within the specific application which are representative of commonly utilized operations within that application.

Next, the process passes to block 66, which illustrates the starting of the trace operation. As described above, any suitable trace application may be utilized which is capable of identifying and recording input/output operations which occur during execution of the representative transactions selected in block 64. Thereafter, the process passes to block 68 which illustrates the execution of the identified software application.

After initiating execution of the selected software application, the process passes to block 70 which illustrates a determination of whether or not an interrupt call has occurred. If not, the process merely iterates until such time as an interrupt call does occur. After identifying an interrupt call within block 70, the process passes to block 72. Block 72 illustrates the recording of the input/output operation along with an indication of the time of occurrence. Thereafter, the process passes to block 74. Block 74 illustrates a determination of whether or not the selected application is still executing and if so, the process returns iteratively to block 70 to await the occurrence of the next interrupt call.

Still referring to block 74, in the event the software application has ceased execution the process passes to block 76. Block 76 illustrates the conversion of the recorded input/output operations to a benchmark script. This may be done manually; however, a program may be utilized to create generic input/output operations from the recorded indications of input/output operations identified and recorded during execution of representative transactions in the identified software application. Those skilled in the art will appreciate that this may be accomplished, in the depicted embodiment of the present invention, by filtering out all interrupts other than those related to the direct access storage device (DASD) subsystem. Commands relating to the input/output of subsystems such as: OPEN FILE; CLOSE FILE; READ; WRITE; SEEK; etc. are utilized as an input to the editor to create a script simulation of input/output operations within the representative transactions. Additionally, the file pointer position of each read or write is also utilized to ensure the proper "pattern" of the simulation. The pacing of the various commands and the pattern of the data locations are the criteria which may be utilized to later verify the benchmark script thus created. The benchmark script thus created constitutes a simple time ordered list of input/output operations which, while based on the input/output operations recorded during execution of the selected software application, are generic in nature and do not require the installation and/or execution of the original software application.

Next, the benchmark script which has been created is validated, as depicted at block 78. This validation is preferably accomplished by executing the benchmark script thus created while tracing that operation, in the manner utilized to identify and record the original input/output operations during execution of the actual software application. A trace of the input/output operations generated by the benchmark script may then be compared to the trace of the input/output operations generated during execution of the actual software application, to ensure that the input/output operations generated utilizing the script represent an accurate and realistic emulation of the original software application execution. Thereafter, the process passes to block 80 and terminates.

Figure 4:
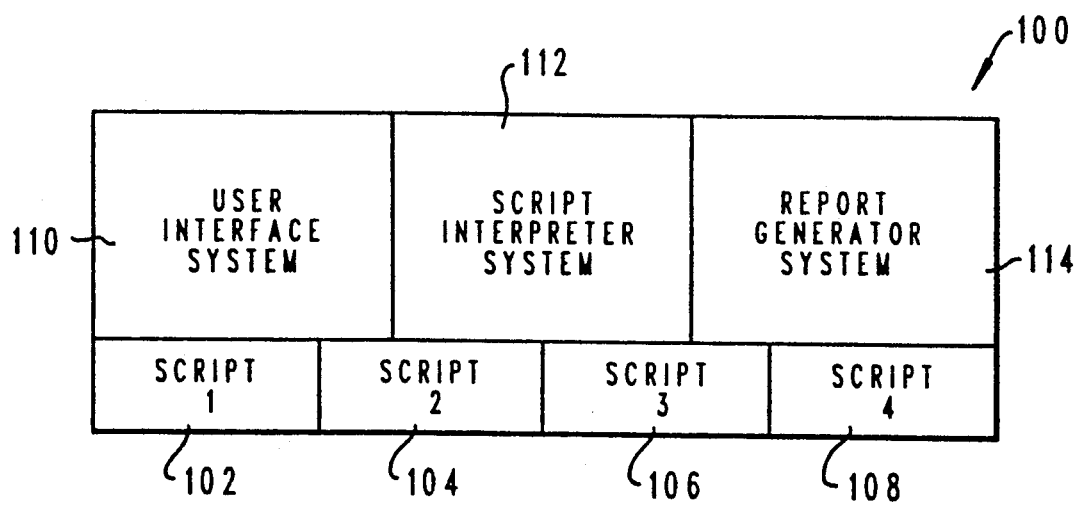
FIG. 4 is a graphic representation of an automated network benchmark performance analysis software system which may be utilized in accordance with the method and system of the present invention.

Referring now to FIG. 4, there is depicted a graphic representation of an automated network benchmark performance analysis software system 100 which may be utilized in accordance with the method and system of the present invention. As illustrated, the performance analyzer software system 100 preferably includes multiple benchmark scripts 102, 104, 106 and 108. In one preferred embodiment of the present invention a benchmark script is prepared for each of multiple software applications which are generally utilized within data processing network 8. In this manner, benchmark performance analysis of a file server within data processing network 8 may be accomplished utilizing benchmark scripts prepared to emulate multiple software applications. This results in a test which more accurately emulates a real world environment for file server performance analysis.

A user interface system 110 is depicted. User interface system 110 is a so-called "front end" interactive system which may be utilized to permit a user to select various performance parameters and the form which the output of performance analyzer software system 100 will take. By utilizing user interface system 110 the user may specify the performance units desired. For example, throughput, application-emulation transactions per second, absolute minimum, maximum and average response time among all workstations, mean minimum, maximum, and average response times among all workstations may be selected. Additionally, in accordance with an important feature of the present invention, the response time for execution of a specified series of input/output operations which emulate a representative transaction within the software application which has been scripted in accordance with the method and system of the present invention may be determined.

The user may also specify testing of more than one terminal within data processing network 8 and which of the multiple scripts within performance analyzer software system 100 are to be utilized. Further, a user may specify a mix of multiple scripts within performance analyzer software system 100. The run length for the performance analyzer benchmark test may also be specified by the user, utilizing user interface system 110.

Next, script interpreter system 112 is also graphically depicted within performance analyzer software system 100. Those skilled in the art will appreciate that script interpreter system 112 may be implemented utilizing a script compiler. Script interpreter system 112 preferably executes the benchmark performance analysis test utilizing the script created in accordance with the description contained herein. The script interpreter system 112 is preferably invoked at a terminal within data processing network 8 to execute one or more scripts 102, 104, 106, and 108 from the script library contained within performance analyzer software system 100. Those skilled in the art will appreciate that a script interpreter or compiler system may be implemented in different ways; however, the sequential execution of each recorded input/output operation within the benchmark script created as described above will permit those input/output operations to be coupled from a terminal to a file server within data processing network 8, emulating the actual execution of a software application.

Finally, report generator system 114 is depicted. Report generator system 114 is a management system which may be utilized to create various reports desired by the user from the operation parameters recorded by performance analyzer software system 100 during execution of the benchmark script. Those skilled in the art will appreciate that report generation system 114 may simply utilize files produced each time a script is executed within a workstation which contain multiple transactions and input/output operations and which also include the response times, operations per second, data throughput and statistical distributions for that script.

The data contained within each log file may then be manipulated utilizing report generation system 114 in any manner found to be desirable by a user in order to generate performance reports which may include system throughput, application-emulation transactions per second, absolute minimum, maximum and average response time among all terminals; mean minimum, maximum and average response times among all terminals and the application-emulation transaction response time among all clients. Additionally, report generation system 114 preferably includes sufficient formatting and performance parameter selection capabilities to permit the reports generated thereby to be formatted for an appropriate printer and/or spread sheet application which may be utilized to automatically generate graphs or other output formats.

Figure 5:
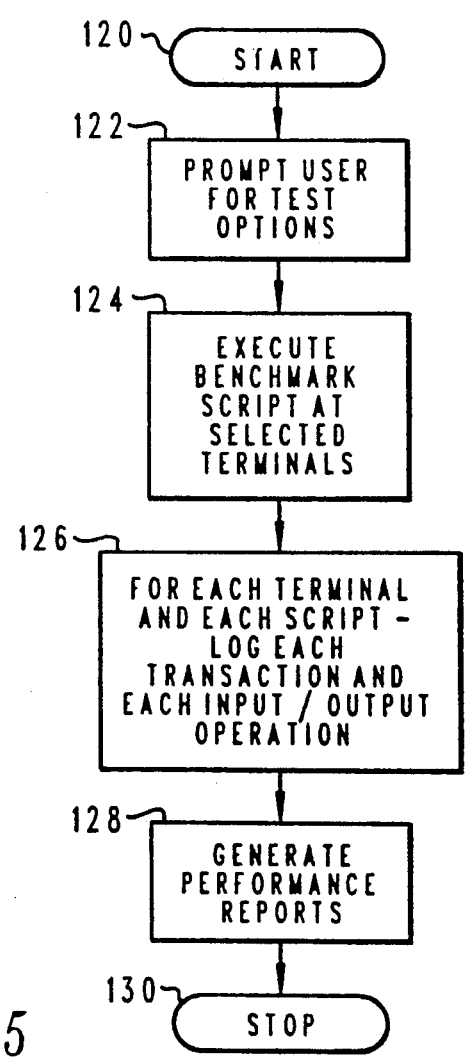
FIG. 5 is a high level logic flowchart illustrating the initiation and performance of a network benchmark performance analysis in accordance with the method and system of the present invention.

With reference now to FIG. 5, there is depicted a high level logic flowchart which illustrates the initiation and performance of a network benchmark performance analysis in accordance with the method and system of the present invention. As illustrated, the process begins at block 120 and thereafter passes to block 122 which illustrates the prompting of the user for test options. As described above, a user may select particular units of measurement for performance analysis and may also specify a number of terminals and a specific application and/or mix of applications which are to be utilized for a desired performance benchmark test. Thereafter, the process passes to block 124.

Block 124 illustrates the execution of the benchmark script at selected terminals and, as depicted at block 126, for each terminal and script, each transaction and input/output operation is logged, preserving an indication of the input/output efficiency of a file server within data processing network 8. Block 128 illustrates the generation of desired performance reports, in any format desired by a user and capable of being generated from the data identified and recorded by the performance analyzer system of the present invention. Thereafter, the process passes to block 130 and terminates.

Referring now to FIG. 6, there is depicted an example of a performance analyzer report which may be generated in accordance with the method and system of the present invention. As illustrated FIG. 6 depicts a report which may be generated utilizing the benchmark performance analysis system of the present invention. The report preferably includes various parameters which specify the system under test, as illustrated at reference numeral 130. Thus, a specification of the operating system, buffer size, run date and start time may be included within the report depicted within FIG. 6. Further, as indicated at reference numeral 132, files defined for utilization by the benchmark script utilized for this test may also be specified within the report depicted within FIG. 6. Thereafter, as depicted at reference numeral 134, various measurements specified by the user may be listed.

Additionally, columns 136, 138, 140, and 142 may be utilized to list a particular operation the average time required for that operation, the total time devoted to that operation and the throughput for that operation respectively. Thus, when utilizing a benchmark script created in accordance with the method and system of the present invention, the average and total amount of time required to process specified operations which are highly representative of those operations generated during actual execution of a representative transaction within a software application generally utilized within the data processing system may be determined. Of course, those skilled in the art will appreciate that the method and system of the present invention may be utilized to generate reports in various other formats, limited only by the capability of the performance parameter selection and the specified data which has been obtained during the benchmark testing. These reports may be utilized for capacity planning based upon application transaction performance results and by allowing a mixture of selected application based transactions may be utilized to more realistically emulate prospective user work loads.

While the invention has been particularly shown and described with reference to a preferred embodiment, it will be understood by those skilled in the art that various changes in form and detail may be made therein without departing from the spirit and scope of the invention. For example, those skilled in the art will appreciate that the method and system of the present invention will find application in performance analysis of various other systems under test, including individual workstations, printer servers, or video systems. To that end, those skilled in the art will appreciate that the term "input/output efficiency" shall mean the efficiency of transferring data to or from any system under test.

We claim:

1. A method in a data processing system for analyzing input/output efficiency, said method comprising the steps of:

identifying at least one software application generally utilized within said data processing system;

executing at least one representative transaction within said at least one software application;

identifying and recording a plurality of input/output operations generated between said at least one software application and an operating system within said data processing system while executing said at least one representative transaction within said at least one software application;

utilizing said recorded plurality of input/output operations to create a benchmark script which emulates said at least one representative transaction; and executing said benchmark script within said data processing system while monitoring input/output operations within said data processing system wherein input/output efficiency may be analyzed with high degree of verisimilitude without requiring actual installation of said at least one software application during testing.

2. The method in a data processing system for analyzing input/output efficiency according to claim 1, further including the step of executing said benchmark script prior to analyzing said input/output efficiency within said data processing system to identify and record a plurality of input/output operations generated thereby for comparison with said input/output operations generated during execution of said at least one representative transaction wherein the verisimilitude of said benchmark script may be validated.

3. The method in a data processing system for analyzing input/output efficiency according to claim 1, wherein said step of identifying and recording a plurality of input/output operations generated by said at least one representative transaction comprises the step of tracing execution of said at least one representative transaction to detect and record interrupt calls generated thereby.

4. The method in a data processing system for analyzing input/output efficiency according to claim 1, wherein said step of monitoring input/output operations within said data processing system during execution of said benchmark script further comprises the step of recording an elapsed time of each input/output operation.

5. The method in a data processing system for analyzing input/output efficiency according to claim 4, further comprises generating a report listing said elapsed time of each input/output operation.

6. The method in a data processing system for analyzing input/output efficiency according to claim 1, wherein said step of monitoring input/output operations within said data processing system during execution of said benchmark script further comprises the step of recording a time period necessary to execute a series of selected input/output operations within said benchmark script.

7. A method in a data processing system for analyzing input/output efficiency among a plurality of terminals coupled together in a network, said method comprising the steps of:
   identifying at least one software application generally utilized within said network;
   executing at least one representative transaction within said at least one software application;
   identifying and recording a plurality of input/output operations generated between said at least one software application and an operating system within said data processing system while executing said at least one representative transaction within said at least one software application;
   utilizing said recorded plurality of input/output operations to create a benchmark script which emulates said at least one representative transaction; and
   executing said benchmark script within at least one of said plurality of terminals while monitoring input/output operations within said network wherein input/output efficiency may be analyzed with high degree of verisimilitude without requiring actual installation of said at least one software application during testing.

8. The method in a data processing system for analyzing input/output efficiency among a plurality of terminals coupled together in a network according to claim 7, further including the step of executing said benchmark script prior to analyzing said input/output efficiency within said network to identify and record a plurality of input/output operations generated thereby for comparison with said input/output operations generated during execution of said at least one representative transaction wherein the verisimilitude of said benchmark script may be validated.

9. The method in a data processing system for analyzing input/output efficiency among a plurality of terminals coupled together in a network according to claim 7, wherein said step of identifying and recording a plurality of input/output operations generated by said at least one representative transaction comprises the step of tracing execution of said at least one representative transaction to detect and record interrupt calls generated thereby.

10. The method in a data processing system for analyzing input/output efficiency among a plurality of terminals coupled together in a network according to claim 7, wherein said step of monitoring input/output operations within said network during execution of said benchmark script further comprises the step of recording an elapsed time of each input/output operation.

11. The method in a data processing system for analyzing input/output efficiency among a plurality of terminals coupled together in a network according to claim 10, further comprises generating a report listing said elapsed time of each input/output operation.

12. The method in a data processing system for analyzing input/output efficiency among a plurality of terminals coupled together in a network according to claim 7, wherein said step of monitoring input/output operations within said network during execution of said benchmark script further comprises the step of recording a time period necessary to execute a series of selected input/output operations within said benchmark script.

13. A data processing system for analyzing input/output efficiency among a plurality of terminals coupled together in a network, said data processing system comprising:
   means for identifying at least one software application generally utilized within said network;
   means for executing at least one representative transaction within said at least one software application;
   means for identifying and recording a plurality of input/output operations generated between said at least one software application and an operating system within said data processing system while executing said at least one representative transaction within said at least one software application;
   means for utilizing said recorded plurality of input/output operations to create a benchmark script which emulates said at least one representative transaction; and
   means for executing said benchmark script within at least one of said plurality of terminals while monitoring input/output operations within said network wherein input/output efficiency may be analyzed with high degree of verisimilitude without requiring actual installation of said at least one software application during testing.

14. The data processing system for analyzing input/output efficiency among a plurality of terminals coupled together in a network according to claim 13, further including means for executing said benchmark script prior to analyzing said input/output efficiency within said network to identify and record a plurality of input/output operations generated thereby for comparison with said input/output operations generated during execution of said at least one representative transaction wherein the verisimilitude of said benchmark script may be validated.

15. The data processing system for analyzing input/output efficiency among a plurality of terminals coupled together in a network according to claim 13, wherein said means for identifying and recording a plurality of input/output operations generated by said at least one representative transaction comprises means for tracing execution of said at least one representative transaction to detect and record interrupt calls generated thereby.

16. The data processing system for analyzing input/output efficiency among a plurality of terminals coupled together in a network according to claim 13, wherein said means for monitoring input/output operations within said network during execution of said benchmark script further comprises means for recording an elapsed time of each input/output operation.

17. The data processing system for analyzing input/output efficiency among a plurality of terminals coupled together in a network according to claim 16, further including means for generating a report listing said elapsed time of each input/output operation.

18. The data processing system for analyzing input/output efficiency among a plurality of terminals coupled together in a network according to claim 13, further comprising means for recording a time period necessary to execute a series of selected input/output operations within said benchmark script.

* * * * *